(12) United States Patent
Vion et al.

(10) Patent No.: US 8,480,907 B2
(45) Date of Patent: Jul. 9, 2013

(54) METHOD FOR THE FLOATATION-CLARIFICATION OF DIFFICULT WATER AND FACILITY FOR IMPLEMENTING SAME

(75) Inventors: Patrick Vion, Houilles (FR); Céline Broutin, Colombes (FR); Christian Garriou, Le Vésinet (FR)

(73) Assignee: Degremont (FR)

( * ) Notice: Subject to any disclaimer, the term of this patent is extended or adjusted under 35 U.S.C. 154(b) by 952 days.

(21) Appl. No.: 12/519,026

(22) PCT Filed: Dec. 4, 2007

(86) PCT No.: PCT/FR2007/001986
§ 371 (c)(1),
(2), (4) Date: Sep. 30, 2009

(87) PCT Pub. No.: WO2008/087264
PCT Pub. Date: Jul. 24, 2008

(65) Prior Publication Data
US 2010/0038314 A1 Feb. 18, 2010

(30) Foreign Application Priority Data
Dec. 13, 2006 (FR) ...................................... 06 10866

(51) Int. Cl.
*C02F 1/24* (2006.01)
*C02F 1/52* (2006.01)
*C02F 1/54* (2006.01)

(52) U.S. Cl.
USPC ........... 210/704; 210/705; 210/726; 210/727; 210/738

(58) Field of Classification Search
USPC .................. 210/704, 705, 725, 727, 726, 738
See application file for complete search history.

(56) References Cited

U.S. PATENT DOCUMENTS

| | | | | |
|---|---|---|---|---|
| 3,959,131 A | * | 5/1976 | Ramirez et al. | 210/707 |
| 6,325,936 B1 | * | 12/2001 | Niijima | 210/626 |
| 6,998,056 B2 | * | 2/2006 | Scherzinger et al. | 210/703 |
| 7,175,768 B2 | * | 2/2007 | Vion | 210/703 |
| 7,332,079 B2 | * | 2/2008 | Coleman, Jr. | 210/221.2 |
| 2004/0026657 A1 | | 2/2004 | Souter et al. | |
| 2005/0211634 A1 | * | 9/2005 | Morse | 210/704 |

FOREIGN PATENT DOCUMENTS

| | | |
|---|---|---|
| EP | 1533277 | 5/2005 |
| FR | 2715581 | 8/1995 |
| FR | 2744119 | 8/1997 |

* cited by examiner

*Primary Examiner* — Thomas M Lithgow
(74) *Attorney, Agent, or Firm* — The Belles Group, P.C.

(57) ABSTRACT

The invention relates to a method for the floatation-clarification of difficult water, in particular heavily polluted surface water, urban or industrial wastewater, rainwater or any type of water that floats with difficulty, particularly water which contains a high percentage of mineral matter or requires the injection of a flocculation aid and which originates from filters or membrane technologies such as ultrafiltration, said method comprising: a coagulation step (A1) in which a dose of coagulant (1) is injected into the water to be treated; a flocculation step (B) in which flocculant (2) is injected (B1) into the water after the coagulation step, in order to agglomerate the suspended particles in the form of flocs; and subsequently a floatation step (C) in which the flocculated water is mixed with an emulsion of air micro-bubbles in a floatation apparatus. A second coagulant injection step (A2) is performed downstream of the flocculant injection (B1) and upstream of the floatation (C).

6 Claims, 1 Drawing Sheet

METHOD FOR THE FLOATATION-CLARIFICATION OF DIFFICULT WATER AND FACILITY FOR IMPLEMENTING SAME

CROSS REFERENCE TO RELATED APPLICATIONS

This application is a National Phase filing under 35 U.S.C. §371 of PCT/FR2007/001986 filed Dec. 4, 2007, which claims priority to Patent Application No. 0610866, filed in France on Dec. 13, 2006. The entire contents of each of the above-applications are incorporated herein by reference.

The invention relates to a method for the clarification of water difficult to treat by flotation, in particular polluted surface water, or municipal or industrial wastewater, rainwater and generally all types of water difficult to treat by flotation, in particular having a high percentage of mineral matter, or for the clarification of all types of water requiring the injection of a flocculation aid and preceding filters or membrane technologies such as ultrafiltration, comprising:
- a coagulation step during which a dose of coagulant is injected into the water to be treated;
- a flocculation step during which a flocculant is injected into the water after the coagulation step, in order to agglomerate the suspended particles in the form of flocs; and then
- a flotation step during which, in a flotation apparatus, the flocculated water is mixed with an emulsion of gas microbubbles, generally air microbubbles, which become attached to the flocs and make them rise to the surface, where they are collected and removed, while the clarified water is removed via the bottom of the flotation apparatus.

More particularly, the invention relates to a flotation method for clarifying water having a turbidity of greater than 30 NTU and a concentration of suspended matter SM of greater than 30 mg/l. In addition, in view of the unexpected consequences of the invention, its application may be extended even to water difficult to treat.

Flotation is a clarification (solid-liquid separation) technology that constitutes an alternative to settling, at least for certain types of water.

In this flotation technology, the coagulation and flocculation steps firstly serve to agglomerate the suspended particles in the form of flocs. The flocculated water is then mixed with a "milk" (i.e. an emulsion) of gas microbubbles, generally air micro-bubbles, the average diameter of which is between 40 and 50 microns. These microbubbles become attached to the flocs which, thus lightened, have a tendency to rise to the surface of the flotation apparatus (flotation unit) where they accumulate, forming a sludge cake or bed. The sludge is collected on the surface of the flotation apparatus, while the clarified water is removed via the bottom of the apparatus.

Some of the clarified water is pumped (generally with a flow rate of between 5 and 15% of the flow rate of water to be treated in clarification) to a pressure of around $4 \times 10^5$ to $6 \times 10^5$ Pa (4 to 6 bar) in a specific tank, called a pressurizing tank, in which air dissolves in a large quantity, i.e. with a concentration of 3 to 5 times the maximum concentration of air in the water at atmospheric pressure. By a sudden expansion to atmospheric pressure in the flotation apparatus, the air is in a supersaturation condition and generates microbubbles. The expansion systems are placed in a specific zone in which the microbubbles are mixed with the flocculated water.

In settling technology, a floc must be dense and/or of large size, so as to be physically separated from the water in a settling tank, by dropping to the bottom thereof.

In contrast, in flotation technology, it is sufficient for the floc to be well formed so that it can be separated by flotation, hence the importance of the preliminary coagulation and flocculation steps.

Coagulation consists of the addition of a reactant or coagulant (in general, trivalent cations), especially iron or aluminum salts, enabling the colloidal particles present in the water to be destabilized and all the electronegative charges on these particles to be neutralized. During this step, the neutralized particles start to agglomerate, forming microflocs. These microflocs are too small to settle and even too small to be attached to the microbubbles.

In all cases, a flocculation step is needed to coarsen these flocs. A mechanically stirred flocculation or static flocculation step is used to achieve the critical floc size for flocs to be attached to the microbubbles.

During this flocculation step, the injection of a flocculation aid (a polymer, a mineral polymer such as activated silica, a natural polymer such as starch or an alginate, or more generally a synthetic polymer) is sometimes necessary, but it is indispensable for the clarification of polluted surface water. The flocculation aid helps to promote agglomeration of the flocs that are too small to form flocs of sufficient size to float, but it also provides floc cohesion. Thus, after flotation of these flocs, the sludge formed is more stable. However, the addition of a flocculation aid may lead to flocs settling in the flocculators and sometimes even in the flotation zone, particularly if the incoming water has too high a concentration of suspended matter (SM).

Consequently, the applications of flotation are often limited to the clarification of lightly polluted water (i.e. water with a turbidity of less than 30 NTU and a concentration of suspended matter SM of less than 30 mg/l), in particular to lake water, drilling water and seawater, or to the clarification of specific industrial effluents or the clarification of biological filter washing water. Hitherto, the field of application of the flotation technique has been unable to be extended effectively to the enormous range of surface water polluted with suspended matter with a concentration of more than 30 mg/l and having a high percentage concentration of mineral matter of about 50%, such as river water, but also to the field of wastewater, washing or scrubbing water and rainwater. This is because it is difficult, if not impossible, to "float" particles that are dense and/or of large size.

However, attempts have been made:
- conventional flotation units have been equipped with bottom scrapers so as to recover the settled sludge. However, the clarified water is polluted and the passage of the scraper further degrades the quality of the floated water by resuspending some of the settled sludge;
- novel flotation units, especially according to patent application FR 2 837 197, incorporate a pre-settler into the flocculator and can partly solve the problem. The content of suspended matter entering the flotation unit is reduced owing to the removal of most of this matter in the pre-settler.

However, in both the above cases it turns out that, beyond a critical threshold of matter entering the flotation unit of around 30 mg/l in the case of conventional flotation units and 100 mg/l in the case of flotation units incorporating a pre-settler, the microbubbles have difficulty in attaching to the flocs. Specifically, these sludge particles, having a high content of mineral matter, are dense and thus have a small surface area for attachment of the microbubbles. The floated sludge particles are unstable—they have a tendency to become detached—and pieces of cake further contaminate the clarified water.

According to the rules of the art in the above-mentioned methods, the coagulant is all injected into an in-line mixer (static mixer, etc.) or into a stirred mixer (flash mixing, etc.), and always upstream of the flocculent injection.

The object of the invention is, particularly, to provide a flotation method for clarifying polluted water with a concentration of suspended matter in excess of 30 mg/l (equivalent to about 30 NTU) or in excess of 100 mg/l (equivalent to about 100 NTU) depending on whether or not a pre-settler has been integrated upstream of the flotation, while still maintaining an optimum quality of the floated water and irrespective of the type of flotation unit, namely a conventional one or one with an integrated pre-settler.

The invention proposes to employ the coagulant at two points:
 a first dose of coagulant is injected at the front end of the unit, upstream of the flocculant injection; and
 a second dose of coagulant is added, contrary to the rules of the art, after the addition of the flocculent.

The method according to the invention is thus characterized in that the flocculation step comprises:
 a zone for mixing the flocculent; followed by
 a zone for mixing a second injection of coagulant, said injection being carried out downstream of the flocculent injection and upstream of the flotation; and then followed by
 a zone for the formation of a single structured type of floc suitable for flotation in a single step.

The results obtained thanks to the two-point injection according to the invention are surprising. The degree of elimination of the suspended matter in the raw water is considerably increased.

The raw water to be treated may have a concentration of suspended matter of greater than 30 mg/l (equivalent to about 30 NTU) or greater than 100 mg/l (equivalent to about 100 NTU) depending on whether or not a pre-settler has been integrated upstream of the flotation.

The method according to the invention may be applied to raw water to be treated which is difficult to treat and requires the injection of a flocculation aid, the treatment according to the method preceding filters or membrane technologies such as ultrafiltration.

Preferably, the total dose of injected coagulant is distributed in the following manner:
 first injection during the coagulation step, upstream of the flocculation: 10 to 70% by weight of the total dose of coagulant; and
 second injection, downstream of the flocculant injection and upstream of the flotation: 90 to 30% by weight of the total dose of coagulant.

The total coagulant dose may be distributed at about 50% for each of the two injections.

During the flotation step, the microbubble emulsion may be obtained by pumping a fraction of the clarified water and pressurizing it in a tank in order to dissolve a large amount of gas, especially air, and to generate the microbubbles by expansion of the pressurized liquid in the flotation apparatus; according to the invention, the pressurizing pressure in the tank may be reduced by about 1 bar (conventionally, from 5 bar to 4 bar). More generally, the pressurizing pressure in the tank is chosen to be low enough for the size (or average diameter) of the microbubbles to be at least equal to 60 µm (a priori unfavorable to flotation).

The invention also relates to an installation for implementing the method defined above, which includes means for injecting a second dose of coagulant downstream of the flocculant injection and upstream of the flotation.

The installation may include a pressurizing tank for generating the microbubbles by expansion of the pressurized liquid in the flotation apparatus; the pressurizing pressure in the tank may be chosen to be low enough for the size of the microbubbles to be at least equal to 60 µm. The pressurizing pressure in the tank may be reduced down to 4 bar.

The invention consists, apart from the arrangements indicated above, of a certain number of other arrangements which will be more explicitly dealt with below with regard to examples described with reference to the appended drawings, which examples are however in no way limiting. In these drawings.

Figure 1:
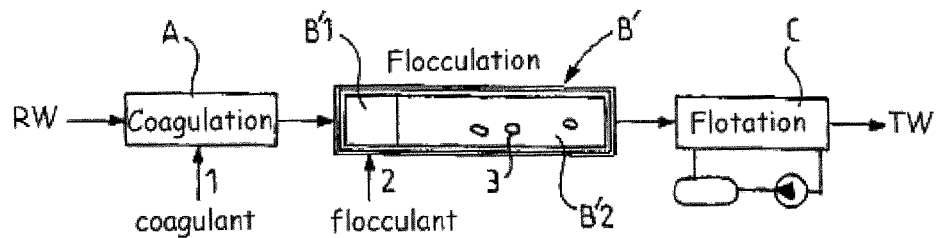
FIG. 1 is a diagram of a treatment line according to the prior art for clarifying polluted or unpolluted surface water.

FIG. 1 shows a conventional treatment line for clarifying surface water. This treatment line employs a standard method made up as follows:
 a coagulation step A, with addition of a coagulant 1 to the raw water RW to be treated;
 a flocculation step B', which receives the water coming from the coagulation step and comprises a zone B'1 for mixing the flocculent 2 and a zone B'2 for coarsening the flocs 3, the coarsening being promoted by mechanical stirring or by static systems (not shown); and, finally
 a flotation separation step C, with an emulsion of gas microbubbles. The sludge particles are recovered at the surface, and the treated water TW is recovered at the bottom of the flotation unit.

Figure 2:
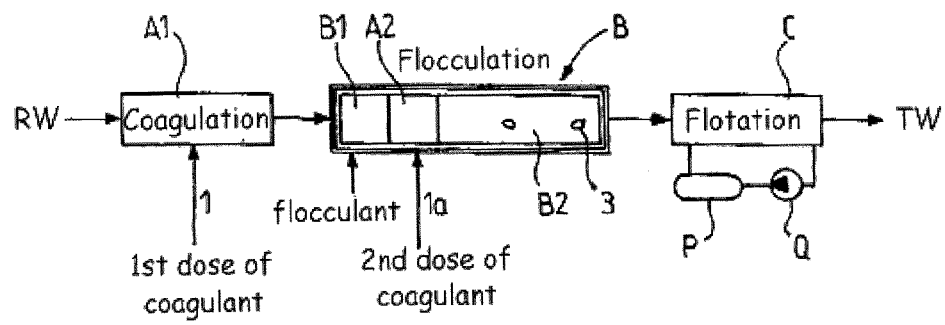
FIG. 2 is a diagram of a treatment line according to the invention for clarifying polluted or unpolluted surface water.

FIG. 2 illustrates schematically a treatment line employing the method according to the invention, made up as follows:
 a coagulation step A1, with addition of a coagulant 1 to the raw water to be treated RW;
 a flocculation step B, comprising:
   a zone B1 for mixing the flocculent 2, followed by
   a zone A2 for mixing a second injection of coagulant 1a, and then followed by
   a zone B2 for coarsening the flocs 3, said coarsening being promoted by mechanical stirring or by static systems; and, finally
 a flotation separation step C.

In the case of lightly polluted surface water, that is to say water having a turbidity of less than 30 NTU with an SM concentration of less than 30 mg/l, the use of the treatment line of FIG. 1 with a single coagulant injection is satisfactory. However, this treatment line does not give acceptable results in the case of polluted surface water having a turbidity of greater than 30 NTU and an SM concentration of greater than 30 mg/l.

The treatment line according to FIG. 2, in accordance with the invention, provides effective treatment of such polluted surface water having a turbidity of greater than 30 NTU and an SM concentration of greater than 30 mg/l, thanks to the additional coagulant injection A2.

Figure 3:
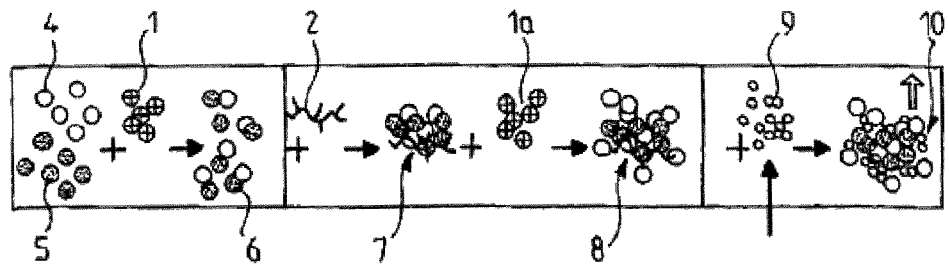
FIG. 3 is a diagram illustrating the phenomena involved in the treatment according to the invention.

The following comments provide one possible explanation for the surprising result obtained with reference to FIG. 3.

Polluted water contains colloids 4 and a high level of mineral matter 5 (concentration greater than 50%). During addition of the coagulant 1, the negative charges of the colloids 4 are neutralized by the trivalent cations of the coagulant 1. The neutralized colloids and the mineral matter are then included in hydroxide precipitates so as to form denser microflocs 6 due to the presence of the mineral matter 5.

During flocculation and through the addition of the flocculent 2, the flocs agglomerate and coarsen, before finally forming denser and more compact flocs 7.

The second injection of coagulant 1*a* results in the formation of hydroxide precipitates that agglomerate around the floc, giving it a more voluminous spatial structure 8 at the end of the flocculation step. The structure of this floc thus formed enables a larger number of microbubbles 9 to be attached thereto, facilitating flotation and consequently stabilizing the floated sludge particles 10.

The importance of the results obtained is given in the specific examples that follow.

EXAMPLES

The following trials were carried out on polluted or doped Seine river water (containing about 50 to 300 NTU).

The characteristics of the raw water were:
turbidity of the raw water RW: 50 to 300 NTU;
SM of the raw water RW: 70 to 300 mg/l;
temperature: 10 to 18° C.

These trials were carried out on a pilot flotation unit with a throughput of 12 m$^3$/h, comprising:
a coagulation step with mixing of the coagulant;
injection of the flocculant into a stirred vessel;
injection of the coagulant into the stirred zone formed by the overflow feeding the static flocculator;
a static flocculation step; and
a flotation cell of 0.4 m$^2$ cross section, corresponding to a velocity of 30 m/h.

The pressurizing/expansion system (see FIG. 2) comprises a pressurizing tank P in which some of the clarified water coming from the flotation unit is pressurized by a pump Q, before being reinjected into the flotation unit in which there is a sudden expansion down to atmospheric pressure. The tank P operates at 4 bar and is connected to expansion systems for forming microbubbles with a size of about 40-50 μm. Under these conditions, the degree of recirculation is about 10%.

The results obtained are:
For a raw water RW turbidity=350 NTU/RW SM=330 mg/l:
1) According to the Prior Art
    Coagulant dose: 40 ppm, as a single injection
    Polymer dose: 0.4 ppm
        ⇒ Turbidity of the treated water TW: 140 NTU
        SM of the treated water TW: 78 mg/l.
2) According to the Invention
    Coagulant dose: 20 ppm (1st injection)+20 ppm (2nd injection),
    Polymer dose: 0.4 ppm
        ⇒ Turbidity of the treated water TW: 4.9 NTU
        SM of the treated water TW: 9.7 mg/l.
For a raw water RW turbidity=100 NTU/RW SM=100 mg/l:
3) According to the Prior Art
    Coagulant dose: 40 ppm (as a single injection)
    Polymer dose: 0.4 ppm
        ⇒ Turbidity of the treated water TW: 4.5 NTU
        SM of the treated water TW: 9.2 mg/l.
4) According to the Invention
    Coagulant dose: 20 ppm (1st injection)+20 ppm (2nd injection),
    Polymer dose: 0.4 ppm
        ⇒ Turbidity of the treated water TW: 1.3 NTU
        SM of the treated water TW: 4.4 mg/l.

The results of the trials show that by injecting the coagulant at two points it is possible to promote bubble-floc attachment, to increase the ascensional velocity of the flocs and to stabilize the floated sludge particles. The rate of removal of suspended matter from the raw water is thus greater than 95%, with the following unexpected consequences or advantages:

1/ An improvement in quality of the floated water, as it is possible to reduce the pressure in the pressurizing tank P for forming the bubbles in the flotation cell. Contrary to the rules of the art, which recommend increasing the pressure and the degree of pressurization in the case of the clarification of polluted surface water, an improvement in the quality of the floated water is observed by reducing the pressure in the tank, this pressure possibly being reduced down to 4 bar. The quality of the floated water is improved by about 20% as a result of greater stability of the floated sludge particles. This reduction in pressure leads to a larger bubble size (higher ascensional velocity) which can be attached only onto more bulky and more structured flocs.

This technique of lowering the pressure is therefore adapted to the invention and to all flocs of large spatial structure, such as:
flocs formed with excess coagulant and without flocculent injection;
flocs of a biological nature, etc.

2/ An extension of the filtration cycles, of the sand filter type behind the flotation unit: the second coagulant injection makes it possible to structure the floc (spatial structure of the voluminous floc) but also to neutralize the residual polymer having a very high clogging power, which is itself injected upstream of the second coagulant injection. The duration of filtration cycles (between two washing operations) is thus extended. To give an example, the duration of a sand filter cycle, initially lasting 18 hours, was extended to 30 hours.

3/ Certain membrane (ultrafiltration) technologies preclude the use of the polymer for their pretreatment owing to its clogging power. Thus, flotation with injection of flocculant cannot be used in pretreatment in difficult cases, such as for polluted water. The invention therefore makes it possible to use flotation in ultrafiltration pretreatment, even with polluted water.

The invention is applicable irrespective of the type of flocculator upstream of the flotation. However, the risks of settling in low-energy stirred or static flocculators are high. It is necessary to provide systems either for sludge resuspension, using high-speed impellers, or for sludge recovery, such as scrapers or a settling zone with extraction pumps.

The invention claimed is:

1. A method for the clarification of water difficult to treat by flotation, in particular polluted surface water, or municipal or industrial wastewater, rainwater and all types of water difficult to treat by flotation, in particular having a high percentage of mineral matter, or for the clarification of all types of water requiring the injection of a flocculation aid and preceding filters or membrane technologies such as ultrafiltration, comprising:
    a coagulation step (A1) during which a dose of 10% to 70% by weight of the total dose of a mineral coagulant (1) is injected into the water to be treated, which has a turbidity of greater than 30 NTU and a concentration of suspended matter SM of greater than 30 mg/l, and the coagulant comprising trivalent cations, especially iron or aluminum salts;
    a flocculation step (B) during which a flocculant (2) is injected (B1) into the water after the coagulation step, in order to agglomerate the suspended particles in the form of flocs, wherein the flocculation step comprises:
- injection of the flocculant into a zone (B1) for mixing the flocculant (2), followed by
- a second injection of the same mineral coagulant, having a dose of 30% to 90% by weight of the total dose of the mineral coagulant, said injection being carried out downstream of the flocculant injection in a zone (A2) for mixing, and
- coarsening of the flocs (3), suitable for flotation in a single step, in a zone (B2) following the zone (A2) for mixing; and then
- a flotation step (C) during which, in a flotation apparatus, the flocculated water is mixed with an emulsion of gas microbubbles, generally air microbubbles, which become attached to the flocs and make them rise to the surface, where they are collected and removed, while the clarified water is removed via the bottom of the flotation apparatus.

2. The method as claimed in claim 1, characterized in that the raw water to be treated for the flotation units preceded by a pre-settler has a turbidity of greater than 100 NTU and a concentration of suspended matter SM of greater than 100 mg/l.

3. The method as claimed in claim 1, characterized in that the raw water to be treated is difficult to treat, requiring the injection of a flocculation aid and precedes filters or membrane technologies such as ultrafiltration.

4. The method as claimed in claim 1, characterized in that the total coagulant dose is distributed at about 50% for each of the two injections.

5. The method as claimed in claim 1, in which, during the flotation step, the microbubble emulsion is obtained by pumping a fraction of the clarified water and pressurizing it in a tank (P) in order to dissolve a large amount of gas, especially air, and to generate the microbubbles by expansion of the pressurized liquid in the flotation apparatus, characterized in that the pressurizing pressure in the tank (P) is reduced down to 4 bar.

6. The method as claimed in claim 1, in which, during the flotation step, the microbubble emulsion is obtained by pumping a fraction of the clarified water and pressurizing it in a tank (P) in order to dissolve a large amount of gas, especially air, and to generate the microbubbles by expansion of the pressurized liquid in the flotation apparatus, characterized in that the pressurizing pressure in the tank (P) is chosen to be low enough for the size of the microbubbles to be at least equal to 60 μm.

* * * * *